(12) United States Patent
Yoder

(10) Patent No.: US 9,080,908 B2
(45) Date of Patent: Jul. 14, 2015

(54) FLOWMETER DESIGN FOR LARGE DIAMETER PIPES

(71) Applicant: Jesse Yoder, Wakefield, MA (US)

(72) Inventor: Jesse Yoder, Wakefield, MA (US)

(*) Notice: Subject to any disclaimer, the term of this patent is extended or adjusted under 35 U.S.C. 154(b) by 153 days.

(21) Appl. No.: 13/987,433

(22) Filed: Jul. 24, 2013

(65) Prior Publication Data

US 2015/0027236 A1    Jan. 29, 2015

(51) Int. Cl.
*G01F 1/84*   (2006.01)
*G01F 1/76*   (2006.01)
*G01F 1/05*   (2006.01)
*G01F 1/34*   (2006.01)
*G01F 1/56*   (2006.01)
*G01F 1/66*   (2006.01)

(52) U.S. Cl.
CPC  *G01F 1/76* (2013.01); *G01F 1/053* (2013.01); *G01F 1/34* (2013.01); *G01F 1/56* (2013.01); *G01F 1/66* (2013.01)

(58) Field of Classification Search
None
See application file for complete search history.

(56) References Cited

U.S. PATENT DOCUMENTS

| | | | |
|---|---|---|---|
| 3,381,531 A * | 5/1968 | Arutjunov et al. | 73/202 |
| 3,521,487 A | 7/1970 | Akeley | |
| 3,589,185 A | 6/1971 | Burgess | |
| 4,109,524 A | 8/1978 | Smith | |
| 4,140,012 A * | 2/1979 | Hendriks | 73/861.27 |
| 4,187,721 A | 2/1980 | Smith | |
| 4,252,028 A | 2/1981 | Smith et al. | |
| 4,392,385 A * | 7/1983 | Okuda et al. | 73/861.23 |
| 4,420,983 A * | 12/1983 | Langdon | 73/861.18 |
| 4,422,338 A | 12/1983 | Smith | |
| 4,491,025 A | 1/1985 | Smith et al. | |
| 4,556,813 A | 12/1985 | Baumoel | |
| 4,768,385 A | 9/1988 | Cage | |
| 4,793,191 A * | 12/1988 | Flecken et al. | 73/861.357 |
| 4,823,614 A | 4/1989 | Dahlin | |
| 4,916,948 A * | 4/1990 | Inada et al. | 73/202.5 |
| 4,961,344 A * | 10/1990 | Rodder | 73/202 |
| 5,129,263 A | 7/1992 | Chi | |
| 5,241,865 A | 9/1993 | Lew | |
| 5,347,874 A * | 9/1994 | Kalotay et al. | 73/861.357 |
| 5,370,001 A | 12/1994 | LaBrecque et al. | |
| 5,463,899 A * | 11/1995 | Zemel et al. | 73/195 |
| 5,546,814 A | 8/1996 | Mattar et al. | |
| 5,637,804 A | 6/1997 | Hansen | |
| 5,780,736 A | 7/1998 | Russell | |
| 5,824,894 A | 10/1998 | Lucas et al. | |
| 5,861,561 A * | 1/1999 | Van Cleve et al. | 73/861.52 |
| 6,089,104 A | 7/2000 | Chang | |
| 6,170,339 B1 * | 1/2001 | van der Pol et al. | 73/861.357 |
| 6,234,015 B1 * | 5/2001 | Hamada et al. | 73/202.5 |
| 6,298,734 B1 * | 10/2001 | Storer et al. | 73/861.22 |
| 6,301,974 B1 | 10/2001 | van der Pol et al. | |
| 6,330,831 B1 * | 12/2001 | Lynnworth et al. | 73/861.28 |
| 6,330,832 B1 | 12/2001 | Normen et al. | |
| 6,397,685 B1 | 6/2002 | Cook et al. | |
| 6,776,052 B2 | 8/2004 | Crisfield et al. | |
| 7,269,999 B2 * | 9/2007 | Nakano et al. | 73/202.5 |
| 7,614,295 B2 * | 11/2009 | Niikawa et al. | 73/202.5 |
| 7,628,080 B1 * | 12/2009 | Feller | 73/861.12 |

(Continued)

*Primary Examiner* — Harshad R Patel
(74) *Attorney, Agent, or Firm* — Hayes Soloway PC

(57) ABSTRACT

An in-line flowmeter for large diameter pipes includes an outer pipe with a diameter equal to that of the pipe to which it is coupled and an inner measuring tube carrying a portion of the flow, the flow through the measuring tube being sensed by a flowmeter associated with the measuring tube and with the total combined flow rate out of the in-line flowmeter calculated from the sensed flow through the measuring tube.

21 Claims, 10 Drawing Sheets

(56) References Cited

U.S. PATENT DOCUMENTS

| | | | |
|---|---|---|---|
| 7,690,269 B2* | 4/2010 | Simonsen | 73/861.357 |
| 7,963,173 B2 | 6/2011 | Foss et al. | |
| 8,590,400 B2* | 11/2013 | Keita et al. | 73/861.355 |
| 8,857,269 B2* | 10/2014 | Johnson et al. | 73/861.18 |
| 2003/0233860 A1* | 12/2003 | Deane et al. | 73/1.16 |
| 2005/0039546 A1* | 2/2005 | Payne et al. | 73/861.79 |
| 2005/0210998 A1* | 9/2005 | Dimarco et al. | 73/861.22 |
| 2005/0229716 A1* | 10/2005 | Unsworth et al. | 73/861.53 |
| 2007/0062251 A1* | 3/2007 | Anex | 73/1.36 |
| 2008/0066558 A1* | 3/2008 | Sulzer et al. | 73/861.12 |
| 2010/0139416 A1* | 6/2010 | Kolahi | 73/861.357 |
| 2010/0241063 A1* | 9/2010 | Straessler et al. | 73/54.01 |
| 2010/0313676 A1* | 12/2010 | Straub, Jr. | 73/861.28 |
| 2011/0209558 A1* | 9/2011 | Sugiura et al. | 73/861.18 |
| 2012/0144930 A1* | 6/2012 | Aughton et al. | 73/861.28 |
| 2014/0013858 A1* | 1/2014 | Ruchel et al. | 73/861.12 |
| 2014/0260658 A1* | 9/2014 | Strom et al. | 73/861.01 |
| 2014/0260662 A1* | 9/2014 | Rogers et al. | 73/861.12 |
| 2015/0052968 A1* | 2/2015 | Day et al. | 73/1.19 |

* cited by examiner

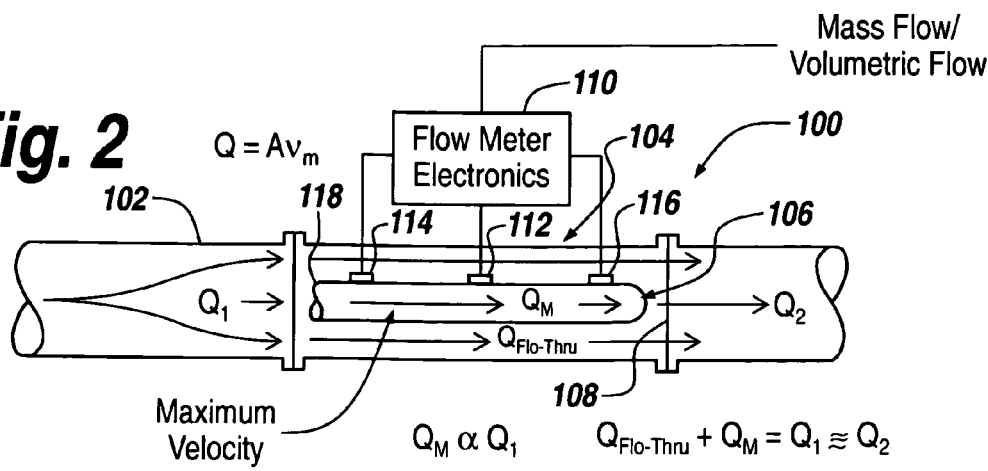
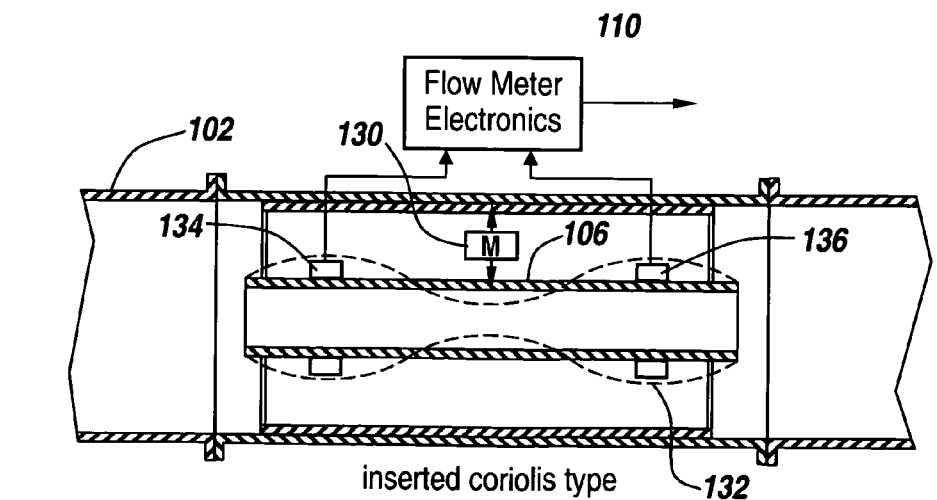

Magnetic Type vibrating bar angular momentum ultrasonic

Vortex

Differential Pressure

FLOWMETER DESIGN FOR LARGE DIAMETER PIPES

FIELD OF THE INVENTION

This invention relates to flowmeters and more particularly to an in-line flowmeter for large diameter pipes.

BACKGROUND OF THE INVENTION

Flowmeters for measuring the mass flow or flow rate through a pipe have included Coriolis flowmeters, magnetic flowmeters, ultrasonic flowmeters, vortex flowmeters and differential pressure flowmeters. When these flowmeters are to be adapted for very large diameter pipes such as pipes in excess of 14 inches, the size of the meters becomes excessively large or the flowmeters cannot be scaled up.

For instance, the largest pipe to be accommodated by a Coriolis type flowmeter is, for instance, a 12 inch diameter pipe. This flowmeter is however on the order of 4 to 6 feet high and is relatively massive, making it inconvenient at best.

There is in fact an urgent requirement for the ability to measure flow in large diameter pipes such as gas pipelines, oil pipelines, and the like and to be able to provide a flowmeter that is in-line insertable between or into these large diameter pipes.

It will be appreciated that the insertion of any blocking orifices or fluid blocking structures induces a downstream pressure drop which is largely unacceptable. For this reason it is only with difficulty that one can measure the mass or volumetric flow through a large diameter pipe to any degree of accuracy using traditional flowmeters.

More importantly it is important to be able to establish a measurement accuracy of 0.15% or better in order to accurately establish the mass or volumetric flow.

It will be appreciated that when oil, gas or other high value fluid is involved, measurement to 0.1% or 0.15% accuracy is important, especially in custody transfer applications when oil or gas is delivered from a wellhead to a remote location.

Typically Coriolis meters send all the fluid through an external tube or tubes and provide a flow measurement through the vibration of the tubes. These Coriolis devices have the required accuracy but, as mentioned before, when scaled up to a 12 inch diameter plus pipe, are exceedingly expensive and massive to the point of non-use. Note that when straight line Coriolis meters are used, the size of the pipe that can be accommodated is only of a size equal to or smaller than the straight line Coriolis tube, generally two inches.

Coriolis meters however do not exhibit excessive pressure drops and are therefore highly sought after.

Ultrasonic devices also produce minimal pressure drops and are highly reliable although they are somewhat less accurate than Coriolis flowmeters.

Magnetic flowmeters can only measure liquids or water, but cannot measure oil or gas', whereas vortex meters involving a bluff body in the fluid flow create vortices and provide a fluid flow measurement for oil as well. However, the vortex flowmeters involve pressure drops, with the bluff bodies often becoming dislodged with the presence of particles in the flow stream. Moreover, these meters are not particularly accurate and may be only accurate to 0.5 to 1%.

Differential pressure meters have been in existence for over 100 years and operate by creating an obstruction in the line to create a pressure drop. These meters then measure the difference in pressure upstream and downstream of the obstruction. In particular, many of these devices use an orifice plate as a primary element. However, the orifice plate can be dislodged or even installed backwards. The major problem with the differential pressure flowmeters is that they operate by creating a pressure drop. Note that for differential pressure flowmeters to work the orifice needs to be relatively small; but when inserted into a large diameter pipe, the pressure drop is unacceptable.

There are of course turbine meters that have spinning rotors or paddles to measure volumetric flow in terms of the rotation of the spinning wheel. However, these spinning wheels have ball bearings that wear out and the presence of the turbine causes a significant pressure drop. Moreover, scaling these meters up to accommodate large diameter pipes is a problem due to the mass of the parts involved.

Presently there are the relatively new sonar flowmeters that instead of creating vortices, measure natural swirls in a stream to create a flow measure. However these sonar devices have limited success in the pulp and paper industry in which dirt and other contaminants are in the flow, as well as being relatively unsuitable for dirty water applications such as the wastewater measurements required in metals or mining operations.

Finally the last type of flowmeter is the photo-optical flowmeter, which injects a beam of light into the flow.

The problems with all of the above flowmeters, aside from the ones described above, is that a large diameter pipe must be necked down to a convenient size in order to measure flow.

The necking down of these large diameter pipes in itself produces pressure drops that must be accounted for downstream, usually by adding additional pumping stations.

There is therefore a requirement to be able to provide an in-line flowmeter for large diameter pipes from 10 inches to 48 inches, and to be able to accurately measure the mass or volumetric flow in the pipe without creating downstream pressure losses.

It is noted that while Coriolis flow measuring devices are thought to be of the highest accuracy in the field, their biggest drawback is pipe size, where presently 70% of the coriolis meters are sold for pipe sizes of 2 inches and under.

When one tries to extend the capability of such Coriolis meters to pipe sizes for instance above 14 inches, it is indeed with only with great difficulty that one can create the proper vibrations within the Coriolis tube or tubes when one needs to size up these tubes. Moreover for larger Coriolis flowmeters on the order of 4 to 6 feet in height, they are so heavy that they require specialized shipping crates to accommodate weights in hundreds of pounds due to the massive amount of steel that is utilized. Thus, the majority of Coriolis flowmeters can only accommodate pipes of 6 inches or less in diameter while still maintaining the 0.1% accuracies.

What is therefore needed is a technology that can utilize the advantageous parts of any flowmeter and yet permit their use for large diameter pipelines, namely for pipes exceeding 14 inches.

SUMMARY OF INVENTION

Rather than constricting the flow of the fluids in these large diameter pipelines in order to be able to measure mass or volumetric flow, in the subject invention an in-line technology is used involving an interior measuring tube located within a larger pipe that has a diameter that matches the diameter of the pipe to which it is coupled.

The flow measuring apparatus is contained within the interior measuring tube or tubes, with a correction factor used to calculate the combined flow through the measuring tube and the outer pipe based on the measurement of the flow through the inner tube.

As a result, it is possible to make measurements utilizing conventional flowmeters within an inner measuring tube and then convert the measurement to reflect the total mass or volumetric flow both through the inner tube and through the larger outer pipe, with the flows being reunited downstream.

This technique is suitable for in-line Coriolis type flowmeters, ultrasonic flowmeters, magnetic flowmeters, thermal flowmeters, vortex flowmeters, turbine type flowmeters and even differential pressure type flowmeters, in which the measurements made are made in a reduced diameter tube that does not result in any significant downstream pressure drop. The result is that large diameter pipes can be accommodated with an in-line inexpensive but accurate flowmeter in which by dividing the flow into a primary flow through an internal measuring tube and diverting the remainder of the flow through the outer pipe or housing, one can make the accurate flow measurements and not have to neck-down or reconfigure a large diameter.

As a result, what is provided is an in-line large diameter flowmeter having the intrinsic accuracy of the flowmeter associated with the small inner tube.

It has been found that the amount of flow disturbance due to the measuring tube is minimal both in terms of the measured flow values as well as any downstream pressure drops.

It is a finding of the subject invention that one can take the measurement of the flowmeter through the measuring tube and scale it to reflect the combined flow so as to provide the same measurement accuracy as that associated with small conventional flowmeters. Also, it should be noted that there is no external measuring equipment outside of the outer pipe which would be unwieldy and expensive. Rather, all of the measuring apparatus is within the larger diameter pipe through the use of the smaller diameter tube and attendant flow measuring.

It will be appreciated that most flowmeters measure volumetric flow. They can measure mass flow only with the addition of pressure and temperature sensors, in which case they use the volumetric flow together with temperature and pressure to compute mass flow. Coriolis flowmeters, by contrast, measure mass flow "directly," meaning not based on a computation. Ultrasonic, vortex, differential pressure, and turbine flowmeters standardly measure volumetric flow, but can measure mass flow with the addition of pressure and temperature sensors.

In summary, an in-line flowmeter for large diameter pipes includes an outer pipe with a diameter equal to that of the pipe to which it is coupled and an inner measuring tube carrying a portion of the flow, the flow through the measuring tube being sensed by a flowmeter associated with the measuring tube and with the total combined flow rate out of the in-line flowmeter calculated from the sensed flow through the measuring tube.

BRIEF DESCRIPTION OF THE DRAWINGS

These and other features of the subject invention will be better understood in connection with the Detailed Description, in conjunction with the Drawings, of which:

FIG. 2 is a diagrammatic illustration of the subject flowmeter adapted to be coupled to large diameter pipes in which an internal measuring tube carries the flow to be monitored, with the remainder of the flow circulating around the outside of the interior measuring tube where it joins the flow from the measuring tube, with the flow being monitored through detection of the flow through the measuring tube;

FIG. 3 is a diagrammatic illustration of one embodiment of the flowmeter of FIG. 2 illustrating a central measuring tube supported at its ends to the interior walls of the larger pipe, with the flow entering both the larger pipe and the smaller measuring tube, with the flow being combined at the distal end of the subject flowmeter where it is injected into a like-size large diameter pipe;

FIG. 4 is a diagrammatic illustration of the operation of the Coriolis flowmeter incorporated in the measuring tube showing its flexing operation within the large diameter pipe of the subject flowmeter;

DETAILED DESCRIPTION

Figure 1A:
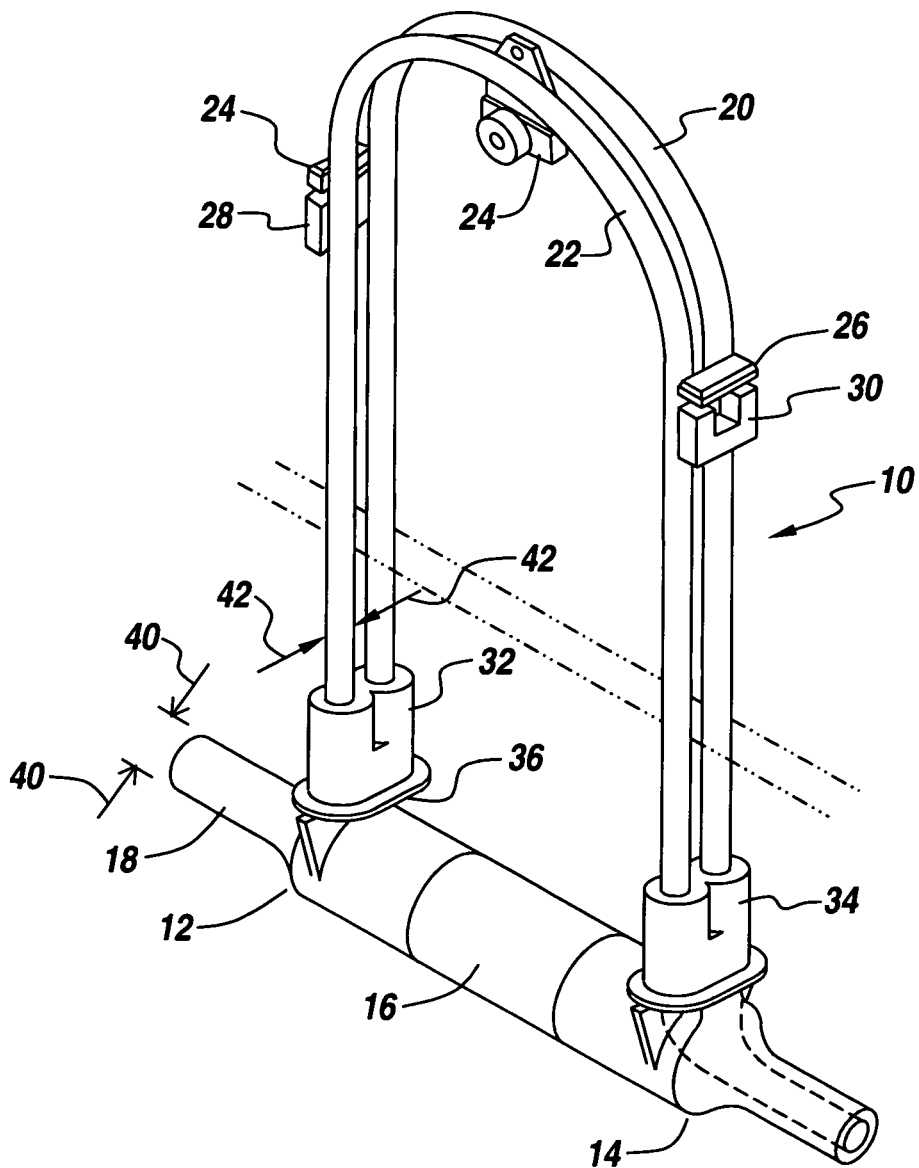
FIG. 1A is a diagrammatic illustration of a prior art Coriolis type flowmeter, illustrating the inability of such flowmeter to be sized to a large diameter pipe.

Referring now to FIG. 1A, a conventional parallel path Coriolis mass flowmeter is shown at 10 in which a pair of manifolds 12 and 14 are utilized with a tubular member 16 to direct the fluid flow from an inlet tube 16 up and through a pair of parallel flow tubes 20 and 22. Here as shown at 23 is a drive mechanism for tubes 20 and 22, as well as a pair of coils 24 and 26 associated with a pair of permanent magnets 28 and 30. Note tubes 20 and 22 are substantially U-shaped and have their ends attached to tube mounting blocks 32 and 34.

In operation, the fluid is introduced into the inlet end of tube 18 where it goes through transition piece 36. The fluid is conducted through a passageway having a gradually changing cross section, where the flow is evenly divided down into the smaller diameter U-shaped tubes 20 and 22. It is noted that tubular section 16 conducts no fluid whatsoever.

What will be immediately apparent is that the size of the inlet orifice of tube 18, here illustrated at double ended arrows 40, is of a predefined limited nature, with the fluid therein being necked down into U-shaped tubes 20 and 22, each of which have a small diameter as illustrated by double ended arrows 42.

The result of this type of construction is that the amount of fluid that can be handled by such a flowmeter is limited. Flow is further limited by the fact that the inlet tube diameters are generally no more than a maximum of 12 inches. When such a large inlet tube is utilized, the U-shaped tubes are massive and approach the aforementioned 4 to 6 foot height. The result is that this particular type of flowmeter cannot be scaled up to large diameter pipes.

Figure 1B:
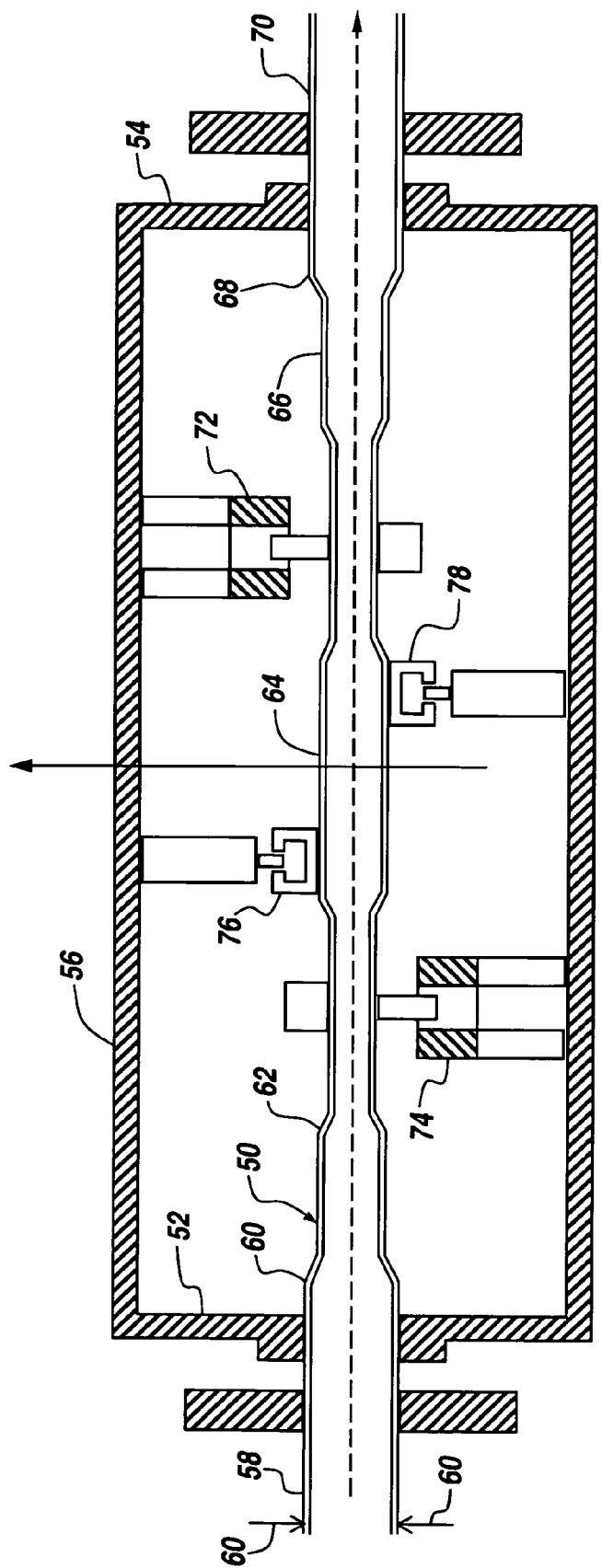
FIG. 1B is a diagrammatic illustration of a prior art straight line Coriolis flowmeter in which the pipe diameter to which it is coupled is neck down to provide for flow through the flowmeter.

Referring to FIG. 1B, another type of prior art Coriolis flowmeter is the straight line Coriolis flowmeter in which a flow tube 50 typically having a diameter ¾ of an inch or less is rigidly attached to sidewalls 52 and 54 of a housing 56, in which the flow tube penetrates the sidewalls.

As can be seen an inlet tube 58 is necked down at 60 and 62 where it passes into a somewhat expanded section 64 that is again expanded at 66 and 68 to provide an exit tube portion 70.

The flow tube is vibrated by two magnetic coil assemblies shown at 72 and 74, with these coils being driven synchronously. Currents produce magnetic fields which exert force on the permanent magnets in which the forces are opposing so that when coil 72 pulls in a negative direction the other coil pulls in a positive direction. Sensors 76 and 78 measure the flexture of tube 50 to provide the flowmeter measurement.

What will be appreciated is that the size of inlet tube 58 as indicated by double ended arrows 80 is relatively small and that this size is further necked down to provide the appropriate diameter and flow for measurement purposes.

As mentioned above, the typical diameter of the tube 58 is on the order of ¾ of an inch which clearly is insufficient to accommodate large diameter pipes.

What will be clear from both of these Coriolis type flowmeters is that it is only with difficulty that one can scale up the flowmeter to large diameter pipes.

First and foremost for sizing up a Coriolis flowmeter is the resonant characteristics of the tubes utilized. When these tubes are made massive, their resonant frequencies are altered considerably such that the Coriolis Effect is more difficult to detect when larger tubes are utilized in an attempt to accommodate large diameter pipes.

In order to accommodate larger diameter pipes such as those 12 inches and up, and referring now to FIG. 2, a flowmeter 100 for large diameter pipes 102 includes an outer cylindrical housing 104 and an inner measuring tube 106.

Here the flow $Q_1$ from the large diameter pipe is bifurcated such that a portion of the flow goes through the measuring tube 106, here illustrated by $Q_m$, whereas there is a flow through component, $Q_{flo-thru}$, which travels around the measuring tube.

The flow through the measuring tube and around it is combined at an exit port 108 such that the flow $Q_{flo-thru}+Q_m$ is equal to Q1 and is approximately equal to Q2.

It is a finding of the subject invention that by utilizing an interior measuring tube one can calculate the total flow through the flowmeter by measuring the flow through the measuring tube. Here for instance flowmeter electronics 110 are utilized to deduce the flow, $Q_m$, through the measuring tube through the utilization of transducers 112, 114 and 116.

Thus, as a general proposition, large diameter pipes can be accommodated with a flowmeter in which the outer housing has a diameter coincident with the diameter of the pipe to which it is coupled, and in which an the inner measuring tube is used to measure flow through a reduced diameter inlet orifice, here shown at 118.

Referring to FIG. 3, if the large diameter pipe 102 has an outlet orifice 120 that has a combined area of $A_1+A_2$; and assuming that the measuring tube 106 has an area of $A_1$ and that the outer housing 104 has an area of $A_2$, then the total flow area is $A_1+A_2$. Note there is very little blockage or pressure drop across the subject flowmetering system. Here it is shown that measuring tube 106 is secured at either end through struts 124 and 126.

Moreover, it is noted that the measuring tube may be a thin wall tube to offer very little in the way of pressure drop across the flowmeter.

If for instance the measuring tube 106 is a Coriolis type measuring device then as illustrated in FIG. 4 a Coriolis type flowmeter tube is driven for instance by an actuator or a motor 130 so as to vibrate the tube as illustrated by dotted outline 132.

The vibration is measured by vibration sensors 134 and 136 such that the phase between the outputs of the sensors measured by flowmeter electronics 110 measures the flow in the measuring tube 106.

Having developed a measurement of the flow through the measuring tube, it is possible through calibration techniques to calibrate this measurement with the total flow through the subject flowmeter such that for any given size flowmeter, with the appropriate constants one can multiply the flow measured in the measuring tube to arrive at the total flow through the flowmeter.

Figure 5:
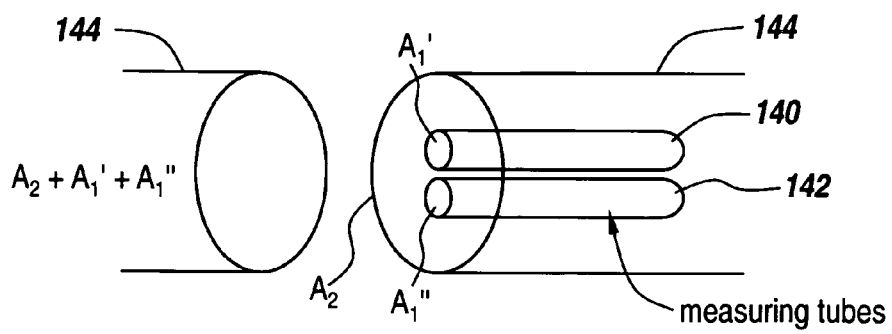
FIG. 5 is a diagrammatic illustration of the utilization of two interior measuring tubes within a large diameter tube in which the sum of the areas of the measuring tubes plus the area of the large diameter tube equaling the area of the large diameter pipe to which the flowmeter is coupled.

As shown in FIG. 5, there may be a multiplicity of measuring tubes here illustrated at 140 and 142, with the combined areas of the measuring tubes and the housing here illustrated at 144 to provide the ability to accommodate all of the flow from a large diameter pipe 144.

Thus the area of the flow is $A_1'+A_1''+A_2$ which in turn equals the total area from pipe 144.

Figure 6:
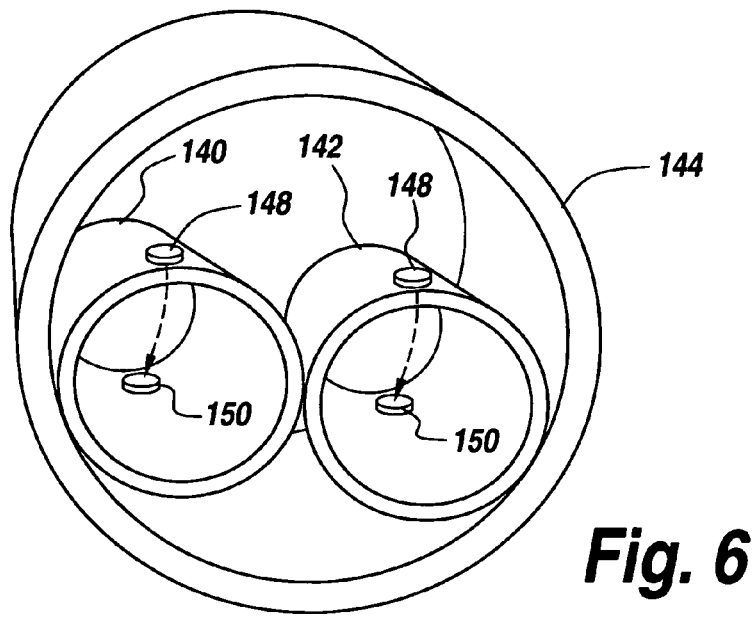
FIG. 6 is a diagrammatic illustration of the utilization of ultrasound sensors as the measuring modality within the measuring tubes of FIG. 5 in which flow is measured by the alteration of the ultrasonic energy from a forward transducer to a rear sensor.

Referring to FIG. 6, in one embodiment utilizing an ultrasound sensing technique, the outer housing 144 is shown to contain measuring tubes 140 and 142 in contiguous contact such that the outer surfaces of these tubes provide for the mounting of these tubes within the housing.

Here pairs of ultrasonic transducers 148 and 150 provide measurement of the flow through the internal measuring tubes. These measured flows are then summed and be scaled to reflect the fluid flow through the entire flowmeter.

Figure 7:
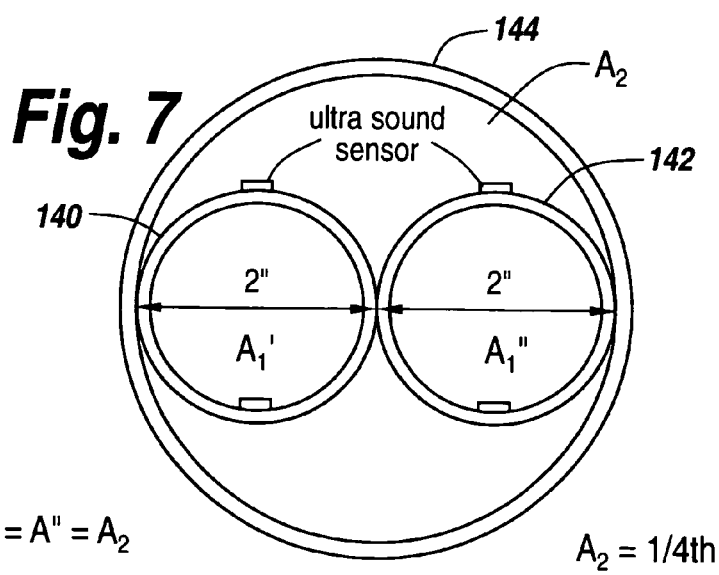
FIG. 7 is a diagrammatic illustration of the equality in the areas of the two internal measuring tubes with the area surrounding the two measuring tubes, illustrating that the area of the flow around the measuring tubes is ¼ the area of the measuring tubes.

As illustrated in FIG. 7, if the outer housing 144 has a diameter of 4 inches and assuming that the two measuring tubes 140 and 142 have diameters respectively of two inches, it can be shown that the area $A_2$ surrounding these tubes is exactly ¼ the flow area associated with each of these measuring tubes. This is a convenient to be able to calculate the total flow volume or flow rate from measuring the flow in these internal measuring tubes.

Figure 8:
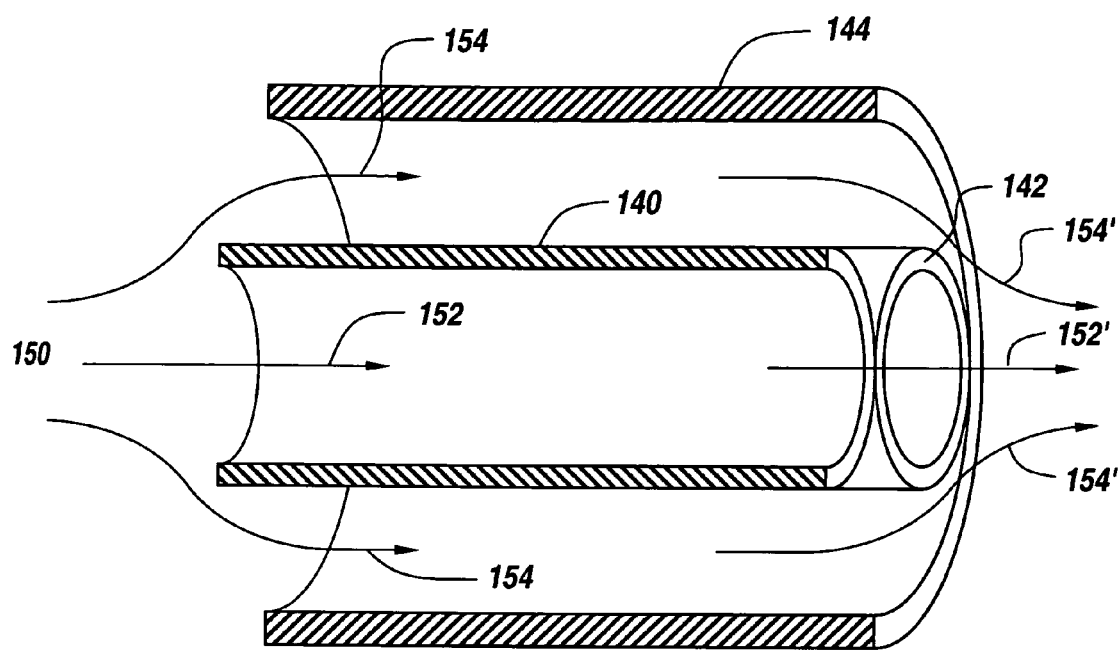
FIG. 8 is a diagrammatic illustration of the flow pattern through the two measuring tubes of FIGS. 5, 6 and 7 to illustrate the separation of the initial flow into the measuring tubes and around the measuring tubes where the flow is then recombined at the distal end of the subject flowmeter.

Referring to FIG. 8, what is clear is that the incoming flow 150 is divided between a flow 152 directly through a measuring tube and the flow 154 that surrounds the measuring tube or tubes. Also shown is the fact that flow 152 that exits is combined with the flow around the tubes here illustrated at 154'.

It is a finding of the subject invention that the introduction of the measuring tube does not result in a significant pressure drop across the subject flowmeter, and further that accurate measurements of the total flow may be obtained by measuring the flow within the measuring tube and then scaling it for the total flow through the flowmeter.

While the subject system has thus far been described in terms of Coriolis flowmeters within a measuring tube as well as ultrasonic flowmeters, it will be appreciated that the subject invention extends to the utilization of a flowmeter associated with an internal measuring tube regardless of the type of flowmeter that is involved.

Figure 9:
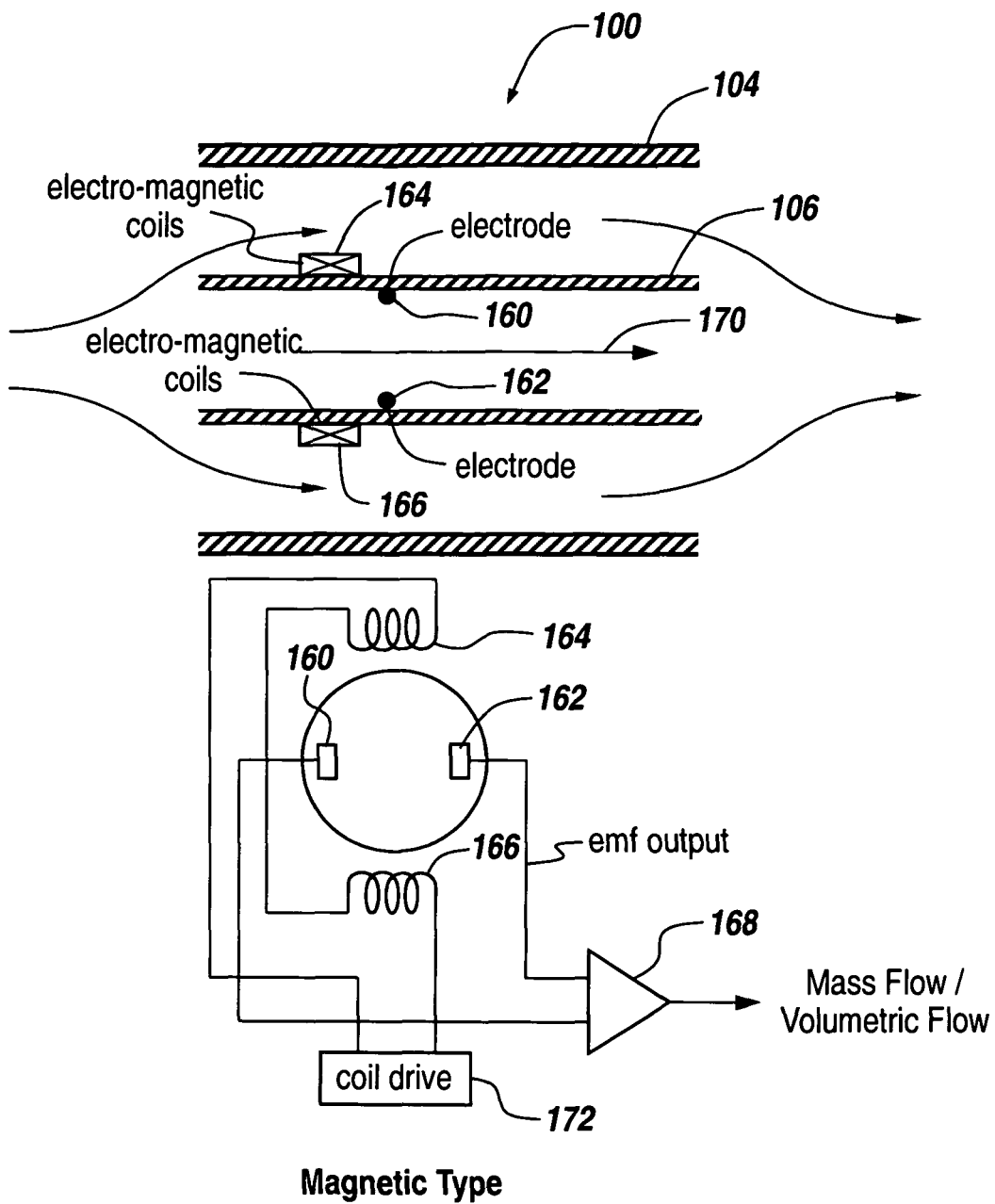
FIG. 9 is a diagrammatic illustration of the utilization of a magnetic type flowmeter in the measuring tube, in which the internal measuring tube includes a electromagnetic coils and electrodes in which a coil drive unit drives the electromagnetic coils and in which the electrodes provide an EMF output that is utilized to sense volumetric flow and/or mass flow.

Referring now to FIG. 9, a magnetic type flowmeter may be utilized for use in measuring tube 106 contained within outer housing 104 in which electrodes 160 and 162 are utilized in combination with electromagnetic coils 164 and 166 to produce an output, here illustrated at the output of amplifier 168, that corresponds to the flow 170 through measuring tube 106. Here a coil drive 172 drives measuring tube 106, whereas a response to the flow is measured by the aforementioned electrodes.

Figure 10:
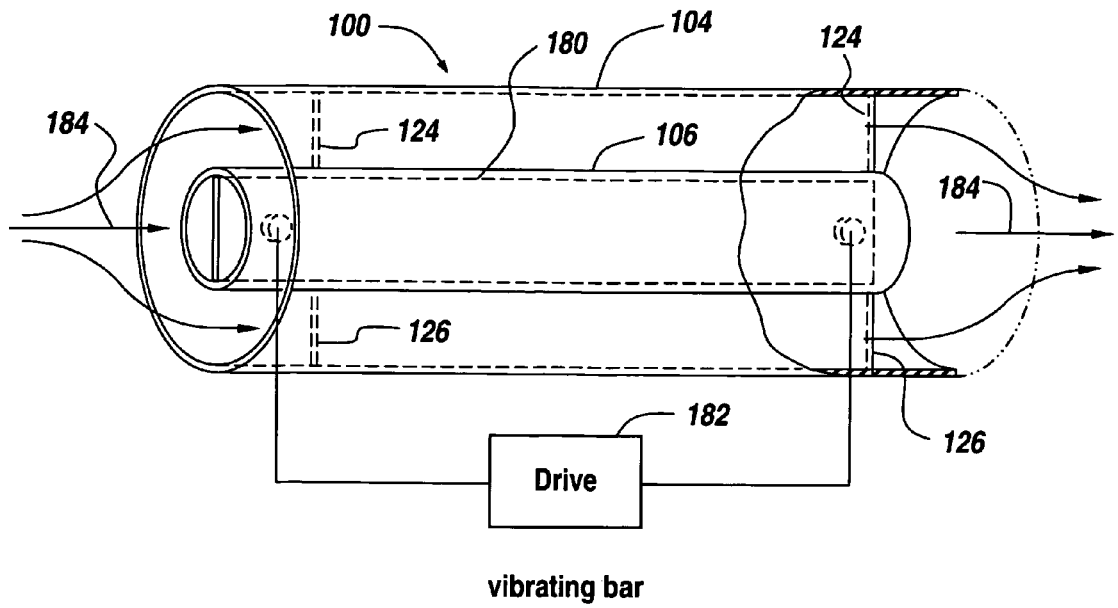
FIG. 10 is a diagrammatic illustration of a vibrating bar type of sensing system in which the vibrating bar is placed within the internal measuring tube of the subject flowmeter.

Alternatively, as illustrated in FIG. 10, a vibrating bar mechanism may be utilized such as shown in by dotted outline 180 in which the bar is located within measuring tube 106 and is driven by a drive and measuring unit 182 that measures the flow 184 through the measuring tube. Here it can be seen that measuring tube 106 is supported in housing 104 via struts 124 and 126.

Figure 11:
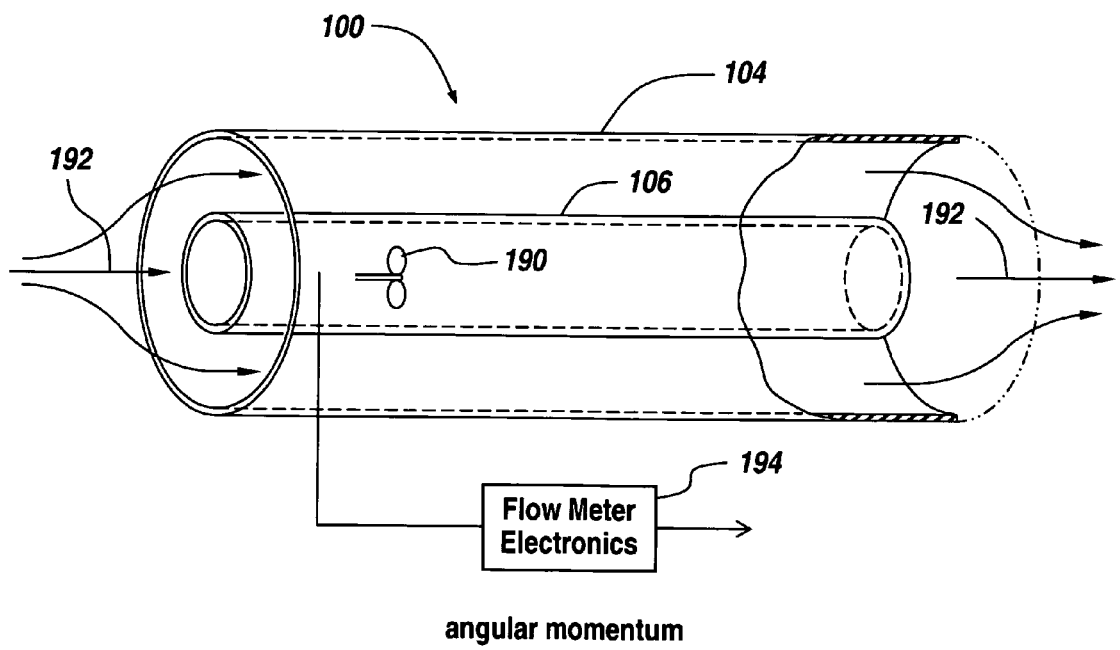
FIG. 11 is a diagrammatic illustration of an angular momentum flowmeter provided in the internal measuring tube of the subject flowmeter in which an impeller is placed within the measuring tube to measure flow rate.

Referring now to FIG. 11, an angular momentum flowmeter may be implemented by placing an impeller structure 190 within measuring tube 106 that is housed within housing 104, with the flow through the measuring tube 192 being measured by impeller 190 through flowmeter electronics 194.

Again, the output of flowmeter electronic 194 can be calibrated with the total flow through the flowmeter so that by measuring the flow through the measuring tube one can accurately calculate the total flow through the subject flowmeter.

Figure 12:
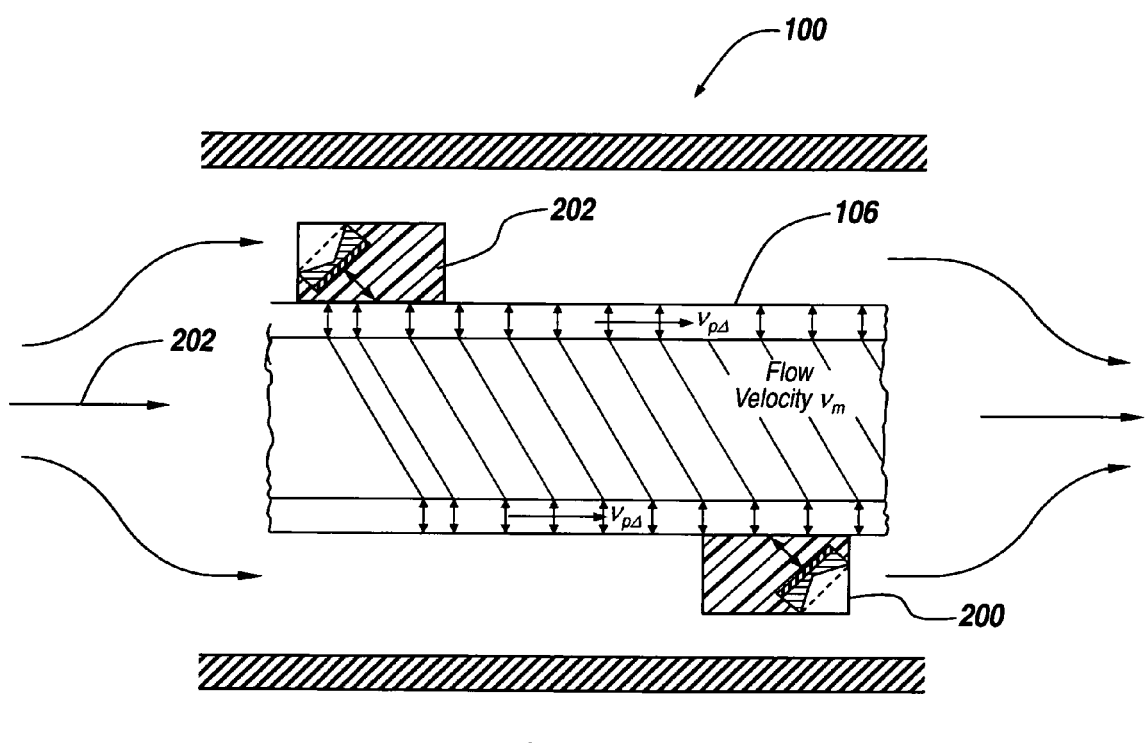
FIG. 12 is a diagrammatic illustration of the utilization of an ultrasonic flowmeter in the measuring tube of the subject flowmeter.

Referring now to FIG. 12, an ultrasonic measuring technique is described in which internal tube 106 is provided with angularly disposed sonic transducers 200 that are utilized to sense the flow 202 through measuring tube 106. In this case an ultrasonic pulse emitting transducer is utilized in which the flow rate is calculated as a function of the radial distances between the emitting transducer and the receiving transducer in a differential measurement channel.

Figure 13:
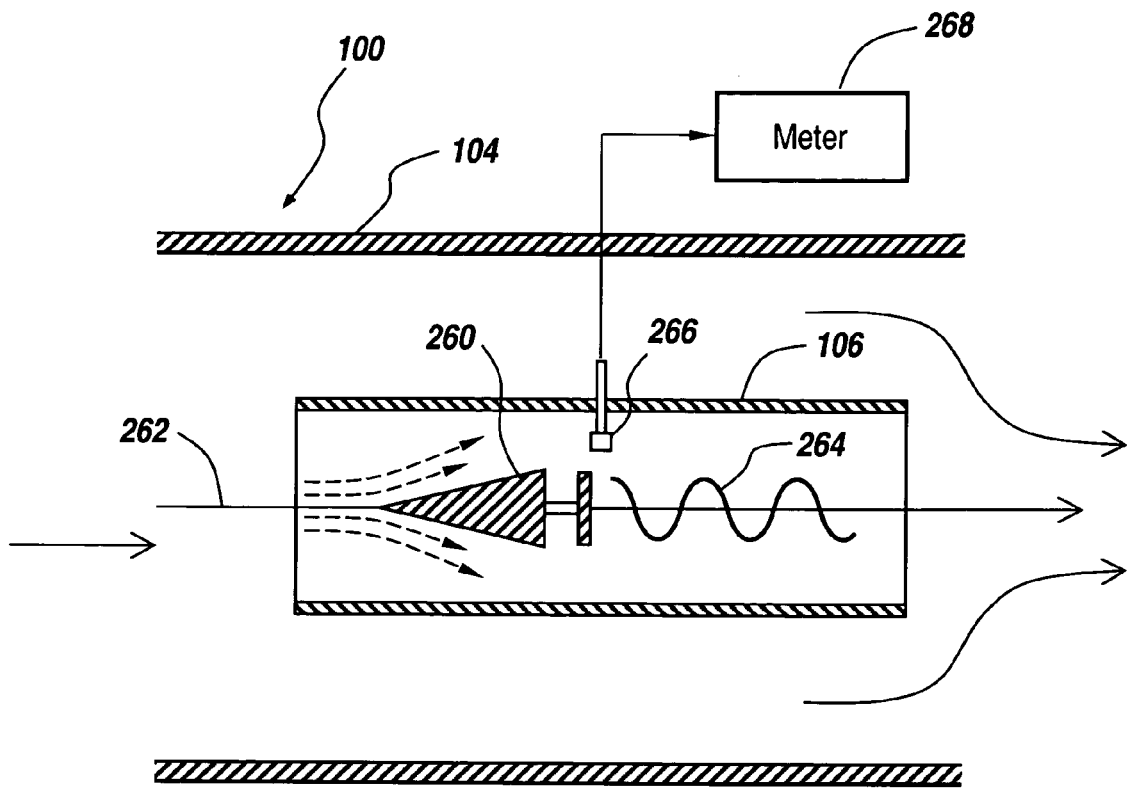
FIG. 13 is a diagrammatic illustration of the utilization of a bluff body in a vortex type flowmeter located within the measuring tube of the subject flowmeter; and, FIG. 14 is a diagrammatic illustration of the utilization of a differential pressure flowmeter within the measuring tube of the subject flowmeter in which the measuring tube is provided with an apertured disc for the creation of a differential pressure.

Referring now to FIG. 13, it will be appreciated that the subject large diameter flowmeter system can be applied utilizing a vortex type flowmeter that employs a bluff body 260 within a measuring tube 106. Incoming flow 262 impacts bluff body 260 in which the bluff body in general is an obstacle.

The obstacle divides the flow around it, with the assembly functioning to produce fluid perturbations in the form of Karman vortex streets. The resultant fluid oscillations in the downstream wake as represented at 264 are sensed by a sensor 266 coupled to a meter 268. As described in U.S. Pat. No. 3,589,185 the vortex is detected by the sensor and is correlated to the flow through the tube in which the sensor provides a signal whose frequency is indicative of flow rate.

Figure 14:
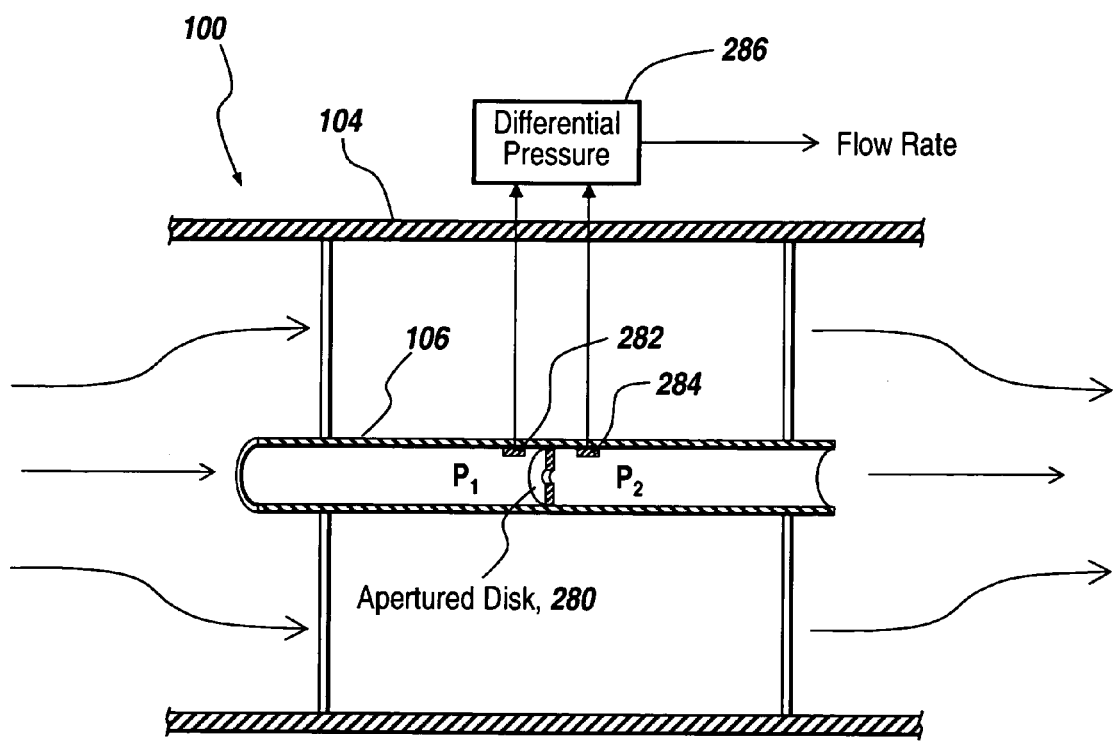

Finally, as illustrated in FIG. 14, a differential pressure flowmeter is shown in which measuring tube 106 is provided with an apertured disc 280 that establishes a pressure $P_1$ before the disc, and a pressure $P_2$ after the disc. Here the pressures before and after the disc are measured by pressure sensors 282 and 284, with the differential pressure being measured as illustrated at 286 to provide the flow rate through the flowmeter.

As will be appreciated in all of these cases, an internal measuring tube with its modest diameter can be utilized to measure the flow rate through a large diameter housing which corresponds in diameter to the large diameter pipe to which the flowmeter is coupled. The result is that one can utilize the flow through an internal measuring tube to calculate the total flow both through the flowmeter to provide a sensitive measuring device capable of being coupled to large diameter pipes.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A flowmeter for measuring and outputting total flow rate in terms of Q=velocity×area of a fluid in a pipeline without constricting the flow in the pipeline to permit measuring of flow in the pipeline, comprising:
   an exterior pipe having a diameter commensurate with the diameter of the pipeline;
   a pair of interior measuring tubes placed within said exterior pipe, said interior measuring tubes having a diameter less than that of said exterior pipe tube, wherein the area surrounding said two measuring tubes is equal to the combined area associated with said two measuring tubes each of said tubes including a sensor for measuring the flow of fluid through said interior measuring tubes in terms of velocity of said fluid times the area of said interior measuring tubes; and
   a processor coupled to said sensor for calculating and outputting the value Q=area×velocity/time for the combined flow through said interior measuring tubes and said exterior pipe based on sensed flow in said interior measuring tubes and the areas thereof, whereby the total flow in said pipeline is measurable in terms of the areas of the tubes and the velocity of the fluid therethrough without constricting the flow in the pipeline during the measurement process.

2. The flowmeter of claim 1, wherein said exterior pipe is in line with said pipeline, thus to provide an in-line flowmeter.

3. The flowmeter of claim 2, wherein the measurement of said flow in each of said interior measurement tubes reflects the total mass or volumetric flow through both said interior measurement tubes and said exterior pipe.

4. The flowmeter of claim 1, wherein the flow is one of fluid or gas.

5. The flowmeter of claim 1, wherein the sensors perform a Coriolis type flow measurement.

6. The flowmeter of claim 1, wherein the sensors perform an ultrasonic flow measurement.

7. The flowmeter of claim 1, wherein the sensors perform a magnetic flow measurement.

8. The flowmeter of claim 1, wherein the sensors perform a vortex flow measurement.

9. The flowmeter of claim 1, wherein the sensors perform a turbine type flow measurement.

10. The flowmeter of claim 1, wherein the sensors perform a differential pressure type flow measurement.

11. The flowmeter of claim 1, wherein said interior measuring tubes do not result in any significant down stream pressure drop.

12. The flowmeter of claim 1, wherein the placement of said interior measuring tubes within said exterior pipe results in the dividing of the flow from said exterior pipe line into a primary flow, with the remainder of the flow passing through said exterior pipe.

13. The flowmeter of claim 1, wherein no sensor and associated apparatus extends outside said external pipe, whereby the dimensional constraints of the flow are restricted to the exterior of said pipeline.

14. The flowmeter of claim 1, wherein said sensor includes a pressure sensor and a temperature sensor, the outputs of which are combined with the flow sensor to compute mass flow.

15. The flowmeter of claim 1, wherein said sensor measures mass flow directly thus to provide a direct reading flowmeter.

16. The flowmeter of claim 15, wherein said direct reading flowmeter sensor includes a Coriolis sensor.

17. The flowmeter of claim 1, wherein said sensor includes one of an ultrasonic sensor, a vortex sensor, a differential pressure sensor and a turbine type sensor for measuring volumetric flow and further including a pressure sensor and a temperature sensor, the outputs of which are utilized to calculate mass flow.

18. The flowmeter of claim 1, wherein said interior measuring tubes are contiguous with each other.

19. The flowmeter of claim 1, wherein said sensors includes a bluff body.

20. The flowmeter of claim 1, wherein said sensors include an apertured disc in said internal measuring tubes to create a differential pressure.

21. The flowmeter of claim 1, wherein said sensors includes a vibrating bar type sensor placed within said internal measuring tubes.

* * * * *